(12) United States Patent
Tanaka

(10) Patent No.: US 6,587,636 B1
(45) Date of Patent: Jul. 1, 2003

(54) REPRODUCING APPARATUS

(75) Inventor: Shuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/317,323

(22) Filed: May 24, 1999

(30) Foreign Application Priority Data

May 29, 1998 (JP) .......................................... 10-149498

(51) Int. Cl.$^7$ ............................................... H04N 5/783
(52) U.S. Cl. .......................................... 386/68; 386/81
(58) Field of Search ........................... 386/6–8, 33, 23, 386/1, 67–81, 109–112; H04N 5/76, 5/92, 9/79

(56) References Cited

U.S. PATENT DOCUMENTS

| | | | | |
|---|---|---|---|---|
| 5,519,544 A | * | 5/1996 | Hara ............................ | 360/22 |
| 5,594,596 A | * | 1/1997 | Kawakami et al. ............ | 386/67 |
| 5,825,971 A | * | 10/1998 | Inoue et al. .................. | 386/122 |
| 6,026,212 A | * | 2/2000 | Oguro .......................... | 386/67 |
| 6,078,724 A | * | 6/2000 | Kawase ........................ | 386/81 |
| 6,292,622 B1 | * | 9/2001 | Lee et al. ...................... | 386/68 |

* cited by examiner

*Primary Examiner*—Thai Tran
(74) *Attorney, Agent, or Firm*—Robin, Blecker & Daley

(57) ABSTRACT

An apparatus for reproducing video data recorded on a tape-shaped recording medium in one of a first recording mode in which the video data is recorded while the tape-shaped recording medium is transported at a first speed and a second recording mode in which the video data is recorded while the tape-shaped recording medium is transported at a second speed different from the first speed, is arranged to reproduce the video data, in the case of a slow reproduction mode, while transporting the tape-shaped recording medium at a predetermined speed irrespective of the recording mode of the video data.

24 Claims, 13 Drawing Sheets

REPRODUCING APPARATUS

BACKGROUND OF THE INVENTION

1. Field of the Invention

The present invention relates to a reproducing apparatus and more particularly to an apparatus arranged to reproduce a video signal from a tape-shaped recording medium.

2. Description of Related Art

The known apparatuses of the above-stated kind include digital VTRs which are arranged to convert video signals supplied from outside into digital signals and to record and/or reproduce the digital signals on or from a magnetic tape.

VTRs are desired in general to be arranged to permit recording over a long period of time by cutting down the amount of tape to be consumed. To meet this requirement, it has been practiced to narrow the pitch of recording tracks by lowering a tape transport speed at the time of recording.

However, the possible extent of narrowing of the recording tracks is limited because magnetic recording characteristics have their limits. In the case of digital VTRs, a high-compression and long-time recording method has been developed. According to the high-compression and long-time recording method, recording time can be increased, taking advantage of digital recording, by slowing the tape transport speed and compressing the amount of information of digital signals to be recorded.

Meanwhile, digital VTRs for general consumers must be arranged to have, in addition to a standard or normal reproducing function, some special reproducing function such as a slow reproduction mode in which signals are reproduced by making the tape transport speed slower than the tape transport speed used for recording.

Assuming that a VTR has a long-time recording mode in which the amount of information of digital signals to be recorded is ½ of the amount of information of digital signals to be recorded in a normal recording mode and the tape transport speed is also ½ of the speed of the normal recording mode, the slow reproduction is arranged to be performed as follows.

With digital signals recorded in the normal recording mode, in reproducing the recorded digital signal at a slow speed which is ⅕ of a normal speed, for example, the tape transport speed is set to a speed which is ⅕ of a tape transport speed used for the normal recording mode. On the other hand, in reproducing at the ⅕ slow speed some digital signals recorded in the long-time recording mode, the tape must be transported at a speed which is "½×⅕=1/10" of the tape transport speed used for the normal recording mode.

However, control over such a low tape-transport speed is extremely unstable. Besides, this unstableness is furthered by the decrease of inertia caused by the recent trend of reducing the size of mechanical parts, etc., of the VTR.

BRIEF SUMMARY OF THE INVENTION

The invention is directed to the solution of the problems of the prior art described in the foregoing.

It is, therefore, an object of the invention to provide a reproducing apparatus arranged to permit a slow reproducing operation to be stably carried out.

It is another object of the invention to provide a reproducing apparatus arranged to be capable of stably reproducing data recorded in a plurality of modes which differ in speed of transporting a recording medium.

To attain the above objects, in accordance with an aspect of the invention, there is provided an apparatus for reproducing video data recorded on a tape-shaped recording medium in one of a first recording mode in which the video data is recorded while the tape-shaped recording medium is transported at a first speed and a second recording mode in which the video data is recorded while the tape-shaped recording medium is transported at a second speed different from the first speed, the apparatus comprising transport means for transporting the tape-shaped recording medium, reproducing means for reproducing the video data from the tape-shaped recording medium, and mode setting means for selectively setting one of a plurality of modes including a first slow reproduction mode in which video data recorded in the first recording mode is reproduced by the reproducing means while the tape-shaped recording medium is transported by the transport means at a third speed different from each of the first and second speeds and a second slow reproduction mode in which video data recorded in the second recording mode is reproduced by the reproducing means while the tape-shaped recording medium is transported by the transport means at the third speed.

These and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

In each of the embodiments, the invention is applied to a digital VTR.

First, recording formats in the first embodiment are described as follows.

Figure 2:
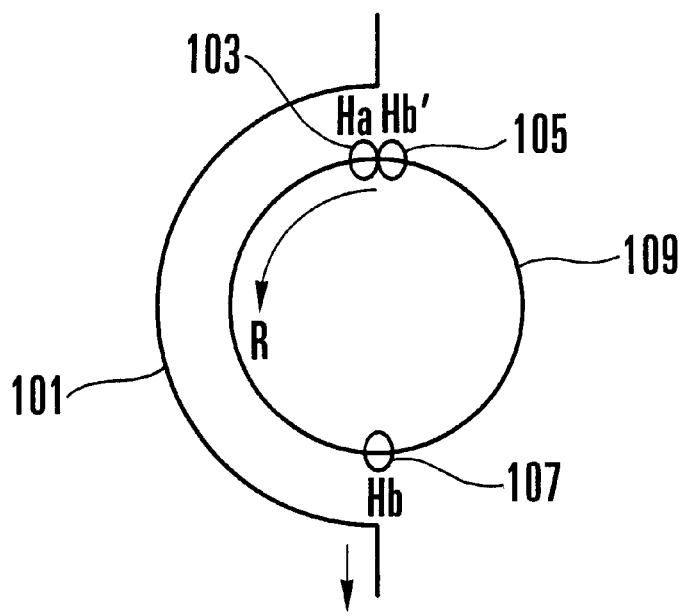
FIG. 2 shows the arrangement of heads in the embodiment of the invention.

FIG. 2 shows the arrangement of heads of the digital VTR according to the first embodiment. As shown in FIG. 2, in the first embodiment, a head drum 109 is provided with a head (Ha) 103, a head (Hb') 105 and a head (Hb) 107. In recording signals, a tape 101 is wrapped around the head drum 109 approximately 180 degrees, and a number of helical tracks are formed on the tape 101 by tracing the tape 101 with the respective heads 103, 105 and 107.

The head (Ha) 103 and the head (Hb') 105 are mounted close to each other on the head drum 109 and have respective different azimuth angles. The head (Hb) 107 has the same azimuth angle as that of the head (Hb') 105 and is mounted on the head drum 109 with a phase difference of 180 degrees from the head (Ha) 103.

Figure 3:
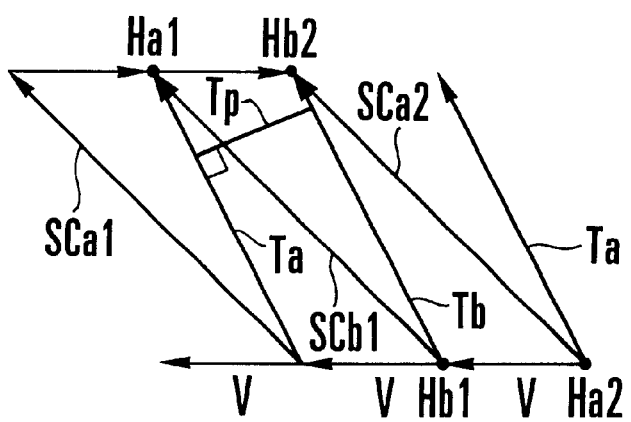
FIG. 3 shows a track format formed by the heads shown in FIG. 2.

FIG. 3 shows the relative positions of the tape 101 and the tracing locus of each head obtained in a normal recording mode. In the normal recording mode, signals are recorded by using the head (Ha) 103 and the head (Hb) 107 alternately.

More specifically, in the first embodiment, while the head (Ha) 103 moves from the lower end of the tape 101 to the upper end thereof in the direction of scanning SCa1, the tape 101 is transported at a tape transport speed V in the direction of the arrow for a period of time corresponding to one-half turn of the head drum 109. Accordingly, when the scanning by the head (Ha) 103 reaches the upper end of the tape 101, the head (Ha) 103 has moved to a relative position Ha1 and a track Ta has been formed on the tape 101. In this instance, when the head (Ha) 103 is at the relative position Ha1, the head (Hb) 107, the phase of which differs 180 degrees from the head (Ha) 103, is at a relative position Hb1. After that, similar to the head (Ha) 103, while the head (Hb) 107 moves from the lower end of the tape 101 to the upper end thereof in the direction of scanning SCb1, the tape 101 is transported at the tape transport speed V for a period of time corresponding to one-half turn of the head drum 109. Accordingly, when the scanning by the head (Hb) 107 reaches the upper end of the tape 101, the head (Hb) 107 has moved to a relative position Hb2 and a track Tb has been formed on the tape 101.

With the above-stated actions repeated one after another, a number of helical tracks are formed on the surface of the tape 101 at a track pitch Tp.

Figure 4:
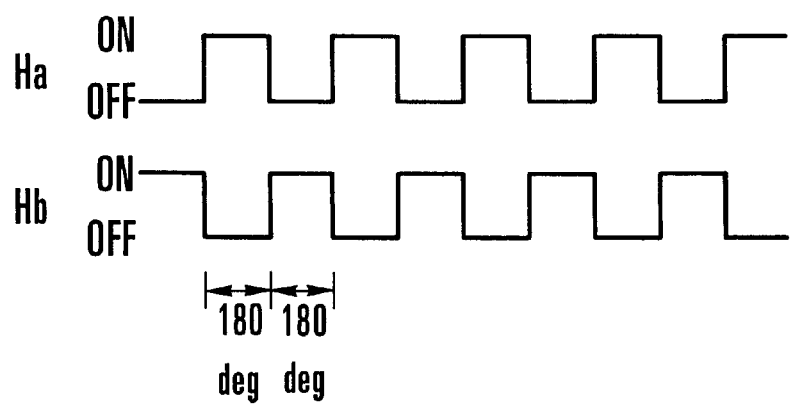
FIG. 4 shows timing of change-over of the heads shown in FIG. 2.

FIG. 4 shows the timing of change-over of the head (Ha) 103 and the head (Hb) 107 in the normal recording mode. The head (Ha) 103 and the head (Hb) 107 alternately turn on every time the head drum 109 rotates 180 degrees.

Figure 5:
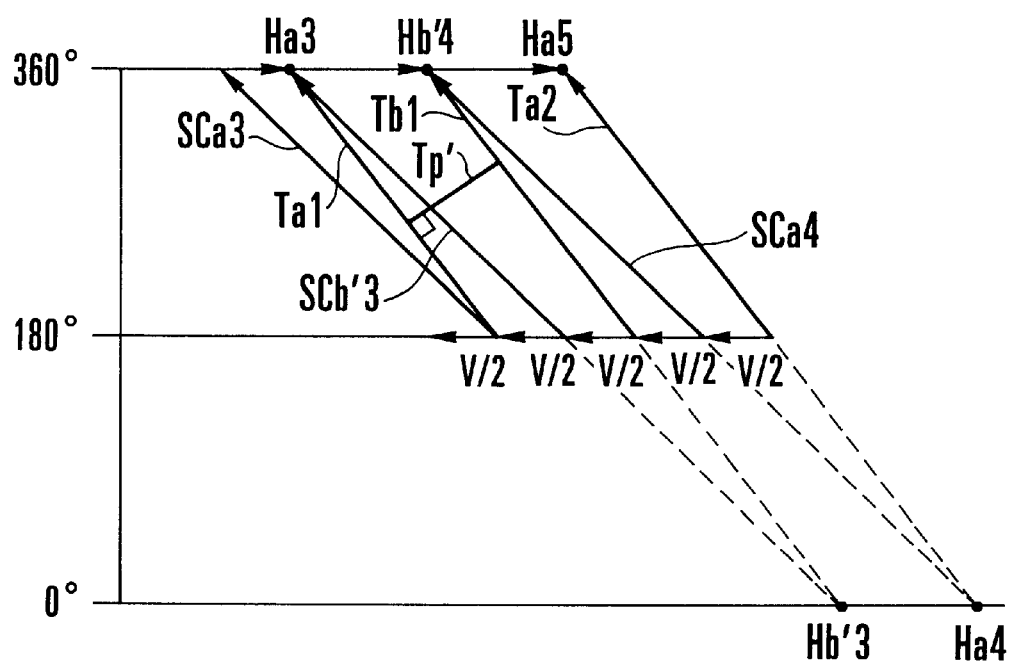
FIG. 5 shows another track format formed by the heads shown in FIG. 2.

FIG. 5 shows the relative positions of the tape 101 and the tracing locus of each of the heads obtained in a long-time recording mode. In the long-time recording mode, signals are recorded by using the head (Ha) 103 and the head (Hb') 105. In FIG. 5, an interval when the head drum 109 rotates from 0 to 180 degrees is a period during which the head (Ha) 103 and the head (Hb') 105 are moving in the air. The head (Ha) 103 and the head (Hb') 105 are actually tracing the surface of the tape 101 during a period of rotation from 180 to 360 degrees of the head drum 109.

Referring to FIG. 5, the head (Ha) 103 is assumed to begin tracing in the direction of scanning SCa3 from the lower end of the tape 101. In the long-time recording mode, while the head (Ha) 103 traces the tape 101 up to the upper end thereof, the tape 101 is transported in the direction of the arrow at a tape transport speed V/2 which is one half of the tape transport speed V of the normal recording mode. Accordingly, a track Ta1 is formed by this tracing. In this instance, the head (Hb') 105, which is disposed close to the head (Ha) 103, has moved to a relative position Hb'3.

After that, the head (Hb') 105 begins to trace the tape 101 in the direction of scanning SCb'3. However, during a period corresponding to the rotation of the drum 109 from 0 to 180 degrees, the head (Hb') 105 moves in the air without tracing the surface of the tape 101. When the head (Hb') 105 revolves 180 degrees from the relative position Hb'3 while the tape 101 is transported further at the tape transport speed V/2, the head (Hb') 105 begins to trace the surface of the tape 101. After that, while the head (Hb') 105 is tracing the tape 101 from the lower end to the upper end thereof in the direction of scanning SCb'3, the tape 101 is transported at the tape transport speed V/2 for a period of time corresponding to one-half turn (180 degrees) of the head drum 109. Accordingly, when the scanning by the head (Hb') 105 reaches the upper end of the tape 101, the head (Hb') 105 has moved to a relative position Hb'4 and a track Tb1 has been formed on the tape 101.

At this time, the head (Ha) 103 has moved to a relative position Ha4. Then, after the head (Ha) 103 moves in the air while the head drum 109 rotates 180 degrees, the head (Ha) 103 begins to trace the tape 101.

With these actions repeated, a number of helical tracks are formed on the tape 101 at a track pitch Tp'.

Figure 6:
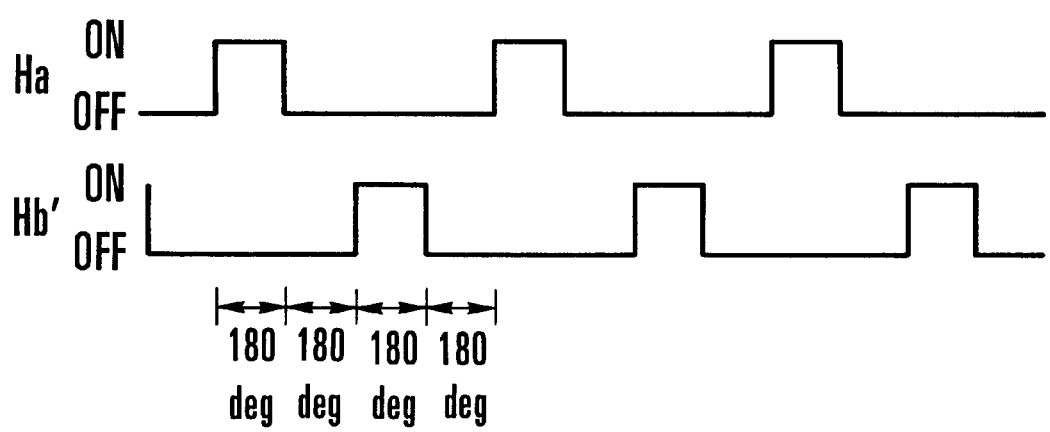
FIG. 6 shows another timing of change-over of the heads shown in FIG. 2.

FIG. 6 shows the timing of change-over of the head (Ha) 103 and the head (Hb') 105 taking place in the long-time recording mode.

As apparent from FIG. 6, in the long-time recording mode, the head (Ha) 103 and the head (Hb') 105 alternately turn on, only for a period corresponding to 180 degrees, every time the head drum 109 makes one rotation (rotation of 360 degrees).

In the long-time recording mode according to the first embodiment, as described above, the heads are arranged to perform their tracing actions for the number of times which is one half of the number of tracing times in the normal recording mode. Therefore, although the tape transport speed of the long-time recording mode is set to one half of that of the normal recording mode, the track pitch Tp' becomes equal to the track pitch Tp of the normal recording mode, so that deterioration of recording signals due to the narrowing of tracks is effectively prevented.

Next, the arrangement of the digital VTR according to the first embodiment is described as follows.

Figure 1:
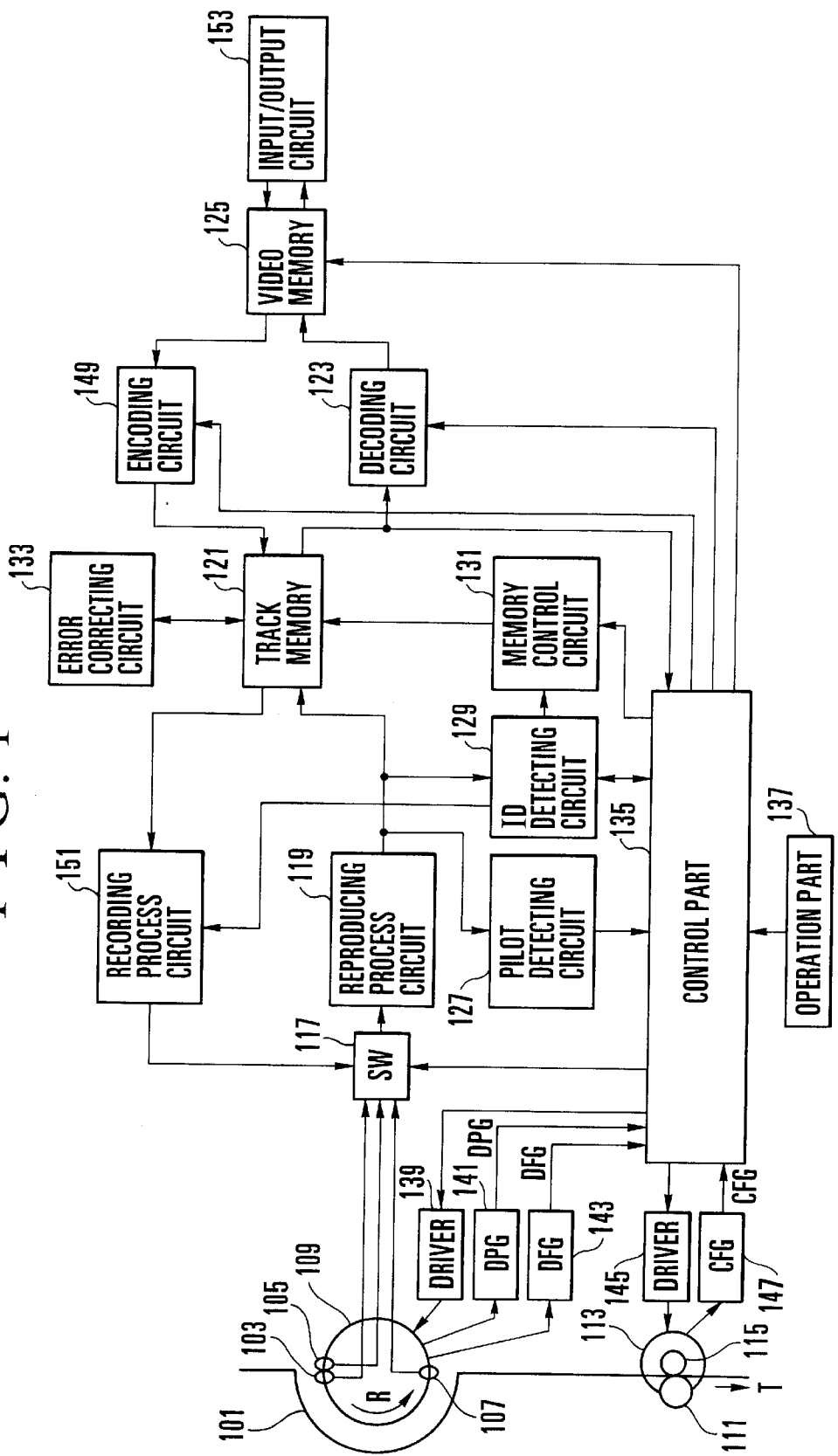
FIG. 1 is a block diagram showing the arrangement of a digital VTR according to an embodiment of the invention.

FIG. 1 shows the arrangement of the digital VTR to which the invention is applied.

The reproducing operation of the digital VTR is first described. Referring to FIG. 1, on the magnetic tape 101, there exist signals recorded in the normal recording mode and signals in the long-time recording mode, as described above.

The tape 101, which is wrapped around the head drum 109 at least 180 degrees, is transported in the direction of the arrow T by a pinch roller 111 and a capstan 115. The head drum 109 is provided with the head (Ha) 103, the head (Hb') 105 and the head (Hb) 107, as mentioned above. The heads 103, 105 and 107 trace the recording tracks formed on the tape 101 one after another to reproduce signals recorded in the recording tracks.

The signal reproduced by each head is supplied to a reproducing process circuit 119 through a switch 117. The switch 117 is controlled by a control part 135 according to the operating mode of the digital VTR. The reproducing process circuit 119 performs a digital demodulation process on the reproduced signal and detects an original digital signal. The original digital signal detected is sent to a track memory 121, a pilot detecting circuit 127 and an ID detecting circuit 129.

The pilot detecting circuit 127 detects a pilot signal component of the reproduced signal outputted from the reproducing process circuit 119. The pilot signal component thus detected is sent to the control part 135 as a tracking error signal.

Here, the pilot signal component, which is used for tracking in the first embodiment, is described as follows.

In the case of the first embodiment, in recording signals, an interleaved NRZI modulation process is carried out by adding one bit data to recording data of 24 bits to produce recording data of 25 bits. The recording data is recorded in a state of having a pilot signal component by deciding the sign of the one bit according to the amount of the pilot signal component included in the recording data of 25 bits.

Figure 7A:
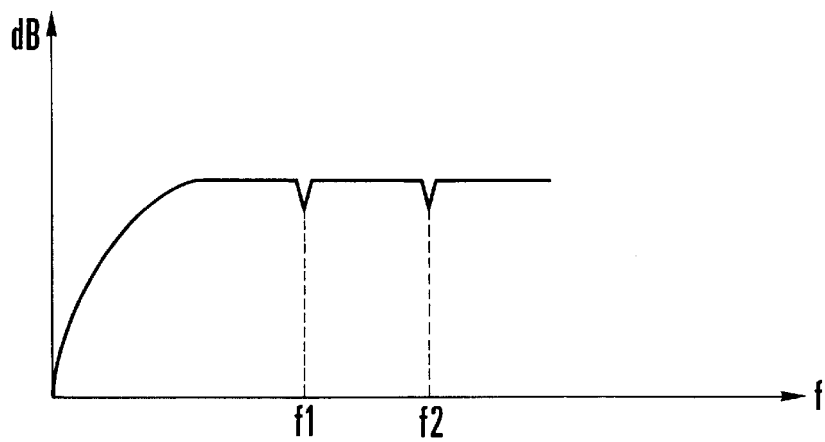
FIGS. 7(a) to 7(c) show the frequency spectra of signals to be recorded by the digital VTR shown in FIG. 1.
Figure 7B:
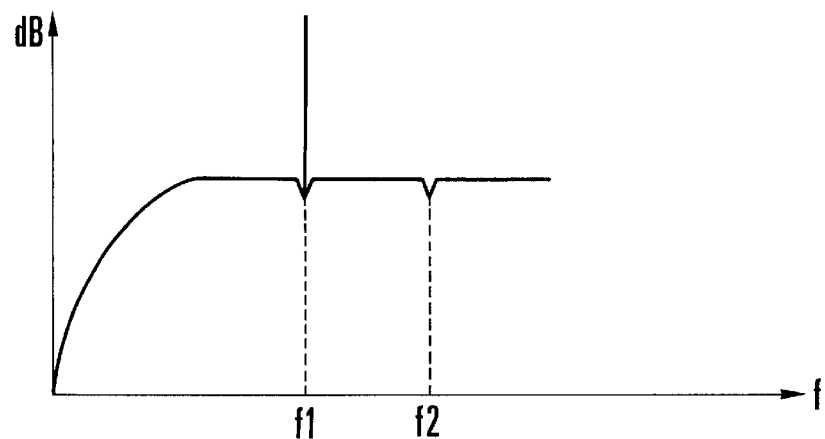
Figure 7C:
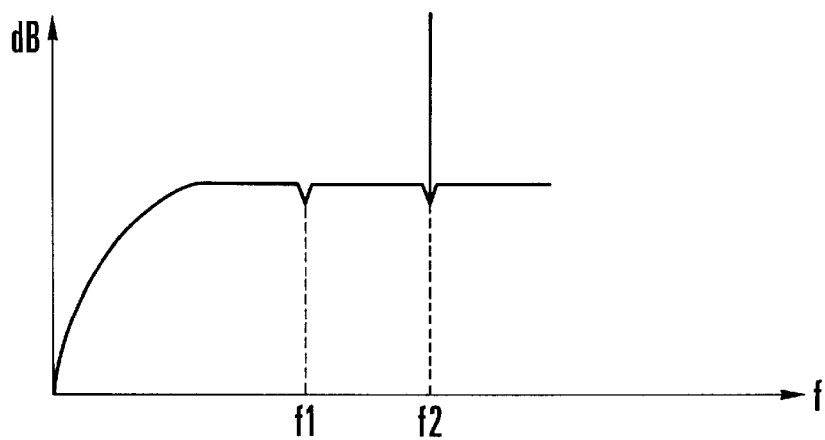

FIGS. 7(a) to 7(c) show the spectra of signals to be recorded in the first embodiment. Specifically, FIG. 7(a) shows the spectrum of a signal which has dips in the spectrum near frequencies f1 and f2. FIG. 7(b) shows the spectrum of a signal which has a peak at the frequency f1 and dips near the frequencies f1 and f2. FIG. 7(c) shows the spectrum of a signal which has a peak at the frequency f2 and dips near the frequencies f1 and f2.

A track in which the signal of FIG. 7(a) is recorded is assumed to be a track F0, a track in which the signal of FIG. 7(b) is recorded is assumed to be a track F1 and a track in which the signal of FIG. 7(c) is recorded is assumed to be a track F3. In the case of the first embodiment, these signals F0, F1 and F2 are recorded in the sequence of F0-F1-F0-F2-F0-F1- . . . . At the time of reproduction, this recording sequence of the signals enables obtaining a tracking error signal on the basis of f1 and f2 components of a reproduced signal leaking from tracks adjacent to the track F0 when the track F0 is subjected to reproduction. Then, during the process of reproduction, an adequate tracking state can be maintained by controlling a capstan motor on the basis of the tracking error signal in such a way as to have the levels of the components f1 and f2 equal to each other.

Figure 8:
FIG. 8 shows the format of a track formed by the digital VTR shown in FIG. 1.

FIG. 8 shows the format of each track formed in the first embodiment. As shown in FIG. 8, a signal ITI, an audio signal, a video signal and a subcode signal are recorded, in this order, from the leading part to the end of each track. In FIG. 8, hatched parts represent gap parts which are provided for absorbing discontinuity of data left during the insert recording in the areas of the audio, video and subcode signals.

The signal ITI is provided for deciding the timing of a start of recording at the time of the insert recording. In this case, data of the signal ITI itself has the pilot signal component as mentioned above. Further, the pilot signal component is superimposed over the whole area from the gap part following the signal ITI to the end of the track. At the time of reproduction, therefore, the tracking error signal can be obtained from the whole area of the track.

Referring again to FIG. 1, the ID detecting circuit 129 is arranged to detect ID data added to every synchronizing block of video data and to send the detected ID data to a memory control circuit 131 and the control part 135. The memory control circuit 131 is arranged to generate a writing address of the track memory 121 on the basis of the ID data sent from the ID detecting circuit 129. With the writing address generated, the reproduced signal sent from the reproducing process circuit 119 is written into the track memory 121. In the case of the first embodiment, the track memory 121 is composed of three banks which permit control over writing and reading independently of each other. Each of the three banks is arranged to be capable of storing one frame amount of video data, audio data and subcode data in a compressed state.

Reproduced data written in the track memory 121 is sent to an error correcting circuit 133 to have its error corrected and, after that, is sent to a decoding circuit 123 and to the control part 135. The decoding circuit 123 performs decoding and expanding processes on the error-corrected reproduced data in a manner corresponding to compressing and encoding processes performed in recording. After these processes, the reproduced data is sent from the decoding circuit 123 to a video memory 125. The control part 135 detects, from the reproduced data received from the track memory 121, recording-mode information indicative of the recording mode employed. In the normal reproduction mode, upon detection of the recording mode, the control part 135 controls the tape transport speed and the head changeover timing in accordance with the recording-mode information.

The video memory 125 is composed of two banks which respectively permit writing and reading actions independently of each other. Each bank is arranged to be capable of storing video and audio data in amounts corresponding to a plurality of frames with information for each frame in an expanded state. The video data read out from the video memory 125 is converted by an input/output circuit 153 into a form suited for outputting before it is sent out to an external monitor or the like.

A DFG circuit 141 and a DPG circuit 143 are respectively arranged to generate a DFG pulse signal indicative of the rotation speed of the drum 109 and a DPG pulse signal indicative of the rotation phase of the drum 109 and to send the DFG pulse signal and the DPG pulse signal to the control part 135. Upon receipt of the DFG pulse signal and the DPG pulse signal, the control part 135 sends a control signal to a driver 139 so as to keep the rotation speed of the drum 109 at a predetermined speed and the rotation phase of the drum 109 at a predetermined standard phase.

A CFG circuit 147 is arranged to generate a CFG pulse signal indicative of the rotation speed of the capstan motor 113 and sends the CFG pulse signal to the control part 135. The control part 135 uses the CFG pulse signal together with the tracking error signal from the pilot detecting circuit 127 and sends a control signal to a driver 145 so as to cause the capstan motor 113 to rotate at a desired speed, in accordance with the above recording-mode information and a reproduction mode instructed through an operation part 137.

A recording operation of the digital VTR is performed as follows.

Video data inputted from the input/output circuit 153 is written into the video memory 125. The video data is read out from the video memory 125 in a sequence suited for compressing and encoding processes. The data read out is supplied to an encoding circuit 149. The encoding circuit 149 encodes the video data, while compressing the amount of information of the video data, by using a known technique for DCT, quantization, variable length encoding, etc., and writes the encoded video data into the track memory 121. In the case of the long-time recording mode, the encoding circuit 149 varies a quantizing coefficient in such a way as to make the amount of information of recording data per frame one half (½) of the amount of information set in the normal recording mode. The error correcting circuit 133 makes the encoded video data stored in the track memory 121 into error-correction-coded video data by adding parity data thereto. The error-correction-coded video data is processed into a plurality of synchronizing blocks with synchronizing data and ID data added to every predetermined amount of data. Each synchronizing block of video data thus obtained is supplied to a recording process circuit 151 to be subjected to the above-stated digital modulation process. The output of the recording process circuit 151 is then supplied through the switch 117 to the heads 103, 105 and 107.

The control part 135 operates the switch 117 by using the DPG pulse signal according to a recording mode designated through the operation part 137, i.e., the normal recording mode or the long-time recording mode, and causes signals to be recorded on the tape 101 in the way described above with reference to FIGS. 2 to 6.

Further, the control part 135 sends a control signal to the driver 145 so as to switch the tape transport speed from one speed over to the other according to the recording mode designated through the operation part 137.

With the digital VTR arranged in the above-stated manner, when the normal reproduction mode is designated through the operation part 137, the control part 135 decides the transport speed of the tape 101 on the basis of the recording-mode information included in reproduced data outputted from the track memory 121. The control part 135 then causes the driver 145 to transport the tape 101 at the tape transport speed decided. Further, in the normal reproduction mode, the control part 135 controls the switch 117 in such a way as to have reproduced data sent to the reproducing process circuit 119 alternately from the head (Ha) 103 and from the head (Hb) 107. In this case, a head switching action is taken as shown in FIG. 4. Further, the control part 135 then causes the reproduced video data to be serially outputted from the video memory 125 in blocks of one-frame amount one after another.

Slow reproducing operations of the digital VTR according to the first embodiment are next described. Slow reproduction of data recorded in the normal recording mode is first described as follows.

In the first embodiment, it is assumed that video data for one frame is recorded in six tracks in the normal recording mode and in three tracks in the long-time recording mode.

Figure 9:
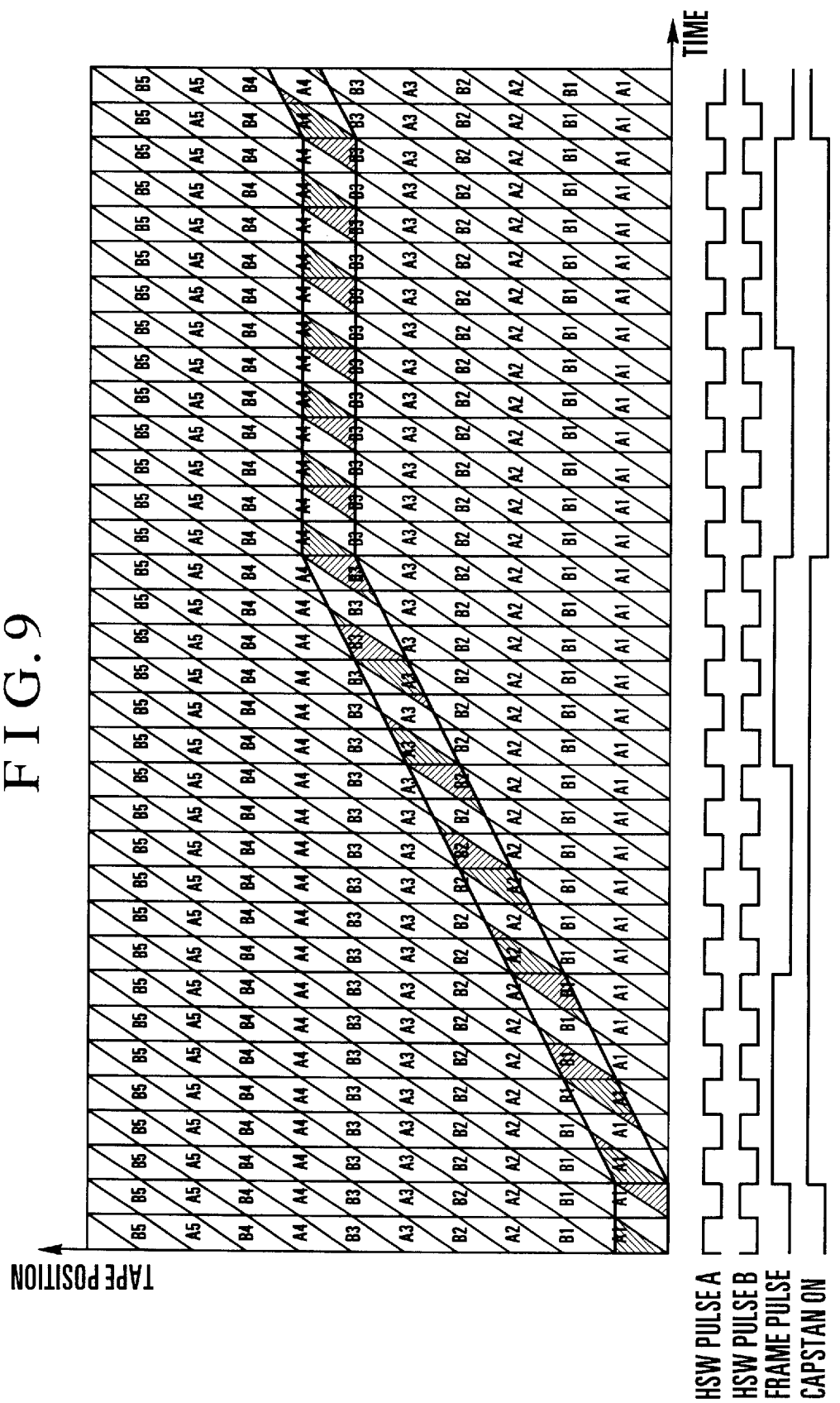
FIG. 9 shows a tracing locus obtained at the time of slow reproduction of data recorded in a normal recording mode by the digital VTR shown in FIG. 1.

FIG. 9 shows a tracing locus of the heads obtained in a case where the data recorded in the normal recording mode is slow-reproduced in the forward direction at an average speed which is ⅕ of the normal speed (hereinafter will be referred to as ⅕-speed slow reproduction).

In the first embodiment, when data recorded in the normal recording mode is slow-reproduced, the head (Ha) 103 and the head (Hb) 107 are used.

In carrying out the ⅕-speed slow reproduction in the first embodiment, first, the tape 101 is transported, for a period of three frames, at a speed which is ⅓ of the normal reproduction speed. Since the azimuth angle of the head (Ha) 103 differs from that of the head (Hb) 107 in the case of the first embodiment, each of the heads 103 and 107 can reproduce data only from tracks having the same corresponding azimuth angle. In other words, the data actually reproduced by the heads 103 and 107 is as shown by hatched parts in FIG. 9. As shown in FIG. 9, all data recorded in tracks A1, B1, A2, B2, A3 and B3 can be reproduced by transporting the tape 101 for a period of three frames at the speed which is ⅓ of the normal reproduction speed.

More specifically, since the first embodiment is arranged to write reproduced data into the track memory 121 in accordance with ID data added to the reproduced data as mentioned above, if the data recorded on one track can be completely reproduced by tracing the same track a plurality of times, the data of that track can be completely written into the track memory 121. Therefore, with the tape 101 transported for a period of three frames at the ⅓ speed as shown in FIG. 9, the video data for one frame recorded in the tracks A1 to B3 can be completely written into the track memory 121.

In slow-reproducing the data recorded in the normal recording mode, according to the recording-mode information included in the reproduced data, the control part 135 sends a control signal (capstan-ON signal) to the driver 145 as shown in FIG. 9 so as to first cause the capstan motor 113 to rotate for a period of three frames and, after that, to stop the capstan motor 113 for a period of two frames. In FIG. 9, "frame pulse" indicates pulses generated within the digital VTR as reference for frames.

In other words, the first embodiment is arranged to carry out the ⅕-speed slow reproduction of data recorded in the normal recording mode, by transporting the tape 101 for a period of three frames at the speed which is ⅓ of the tape transport speed of the normal reproduction mode and, after that, stopping the transport of the tape 101 for a period of two frames.

During the slow reproduction, the control part 135 sends a control signal to the memory control circuit 131 in such a way as to switch use of the writing and reading banks of the track memory 121 from one over to the other when the data for one frame is completely stored into the track memory 121 on the basis of the ID data obtained from the ID detecting circuit 129. After the video data for one frame is sent out to the decoding circuit 123, the process of reading the video data from the track memory 121 is suspended until video data of the next frame is completely written into the track memory 121. As for the video memory 125, the control part 135 controls and causes the video memory 125 to repeatedly output the reproduced data of one and the same picture for a period of five frames, in such a way as to have one picture changed over to another at intervals of five frames.

Slow reproduction, in the forward direction, of video data recorded in the long-time recording mode is next described.

In the first embodiment, when the data recorded in the long-time recording mode is reproduced in the normal reproduction mode, the head (Ha) 103 and the head (Hb') 105 are used, in the same manner as in recording. On the other hand, when the data recorded in the long-time recording mode is reproduced in the slow reproduction mode, the head (Ha) 103 and the head (Hb) 107 are used, in the same manner as in reproducing data recorded in the normal recording mode.

Figure 10:
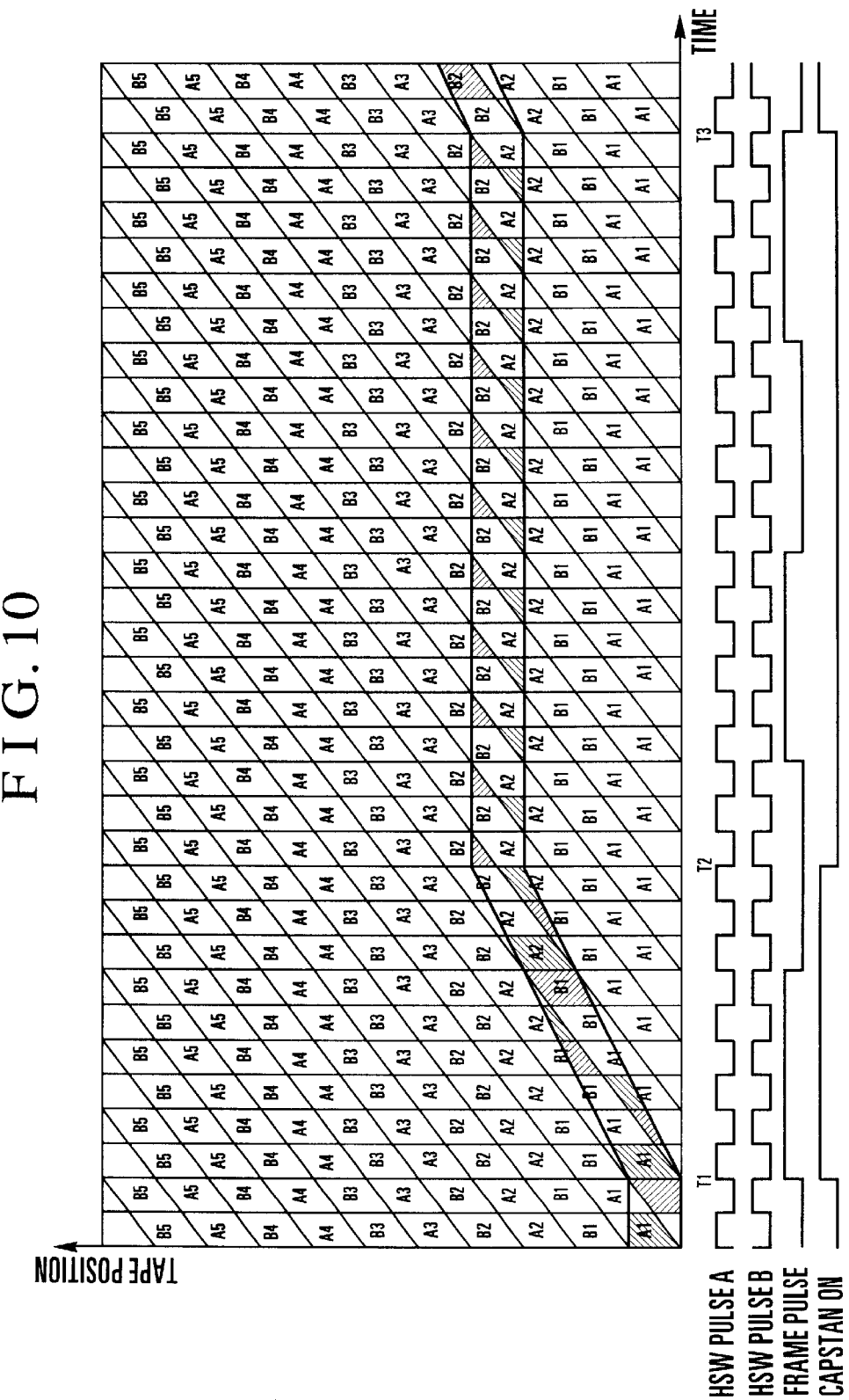
FIG. 10 shows a tracing locus obtained at the time of slow reproduction of data recorded in a long-time recording mode by the digital VTR shown in FIG. 1.

FIG. 10 shows a tracing locus of the heads obtained when the data recorded in the long-time recording mode is slow-reproduced in the forward direction at an average speed which is ⅕ of the normal speed.

During the slow reproduction of data recorded in the long-time recording mode, the rotation speed and phase of the head drum 109 are controlled in the same manner as in the normal reproduction mode. However, the tape transport speed is set to the same speed as the tape transport speed used for the slow reproduction of data recorded in the normal recording mode, i.e., 1/3 of the tape transport speed of the normal recording mode.

Since video data for one frame is recorded in three tracks in the long-time recording mode, the tape 101 is traced alternately by the head (Ha) 103 and the head (Hb) 107, which are used for the normal recording mode, every time the drum 109 rotates 180 degrees, as indicated by hatched parts in FIG. 10. Further, the tape 101 is transported at a speed which is 1/3 of the tape transport speed of the normal recording mode for a period of 1.5 frames, i.e., a period between points of time T1 and T2 as shown in FIG. 10. The video data for one frame recorded in tracks A1, B1 and A2 thus can be completely reproduced.

In slow-reproducing the data recorded in the long-time recording mode, according to the recording-mode information included in the reproduced data, the control part 135 sends a control signal (capstan ON signal) to the driver 145 as shown in FIG. 10 so as to cause the tape 101 to be transported at the speed which is 1/3 of the tape transport speed of the normal recording mode for a period of 1.5 frames and, after that, to stop the transport of the tape 101 for a period of 3.5 frames.

Further, in the same manner as in the slow reproduction of data recorded in the normal recording mode, the control part 135 sends, when data for one track has been stored in the track memory 121, a control signal to the memory control circuit 131 to change the writing bank of the track memory 121 from one bank over to another. The control part 135 also controls the video memory 125 to change its output picture from one picture over to another by changing the reading bank thereof at intervals of five frames.

In the first embodiment, as described above, when data recorded in the long-time recording mode is slow-reproduced, the heads used for the normal recording mode are used, the transport speed of the tape is set to the same speed as the tape transport speed for the slow reproduction of data recorded in the normal recording mode, and the period of transport of the tape is set to one half of the period for the slow reproduction of data recorded in the normal recording mode. This arrangement enables the first embodiment to stably control the tape transport speed even in the case of the slow reproduction of data recorded in the long-time recording mode. The data thus can be reproduced in the same manner as in the case of the slow reproduction of data recorded in the normal recording mode.

Reverse slow reproduction of data recorded in the long-time recording mode is next described as follows.

In this case also, the head (Ha) 103 and the head (Hb) 107 are used in the same manner as in the slow reproduction in the forward direction.

Figure 11:
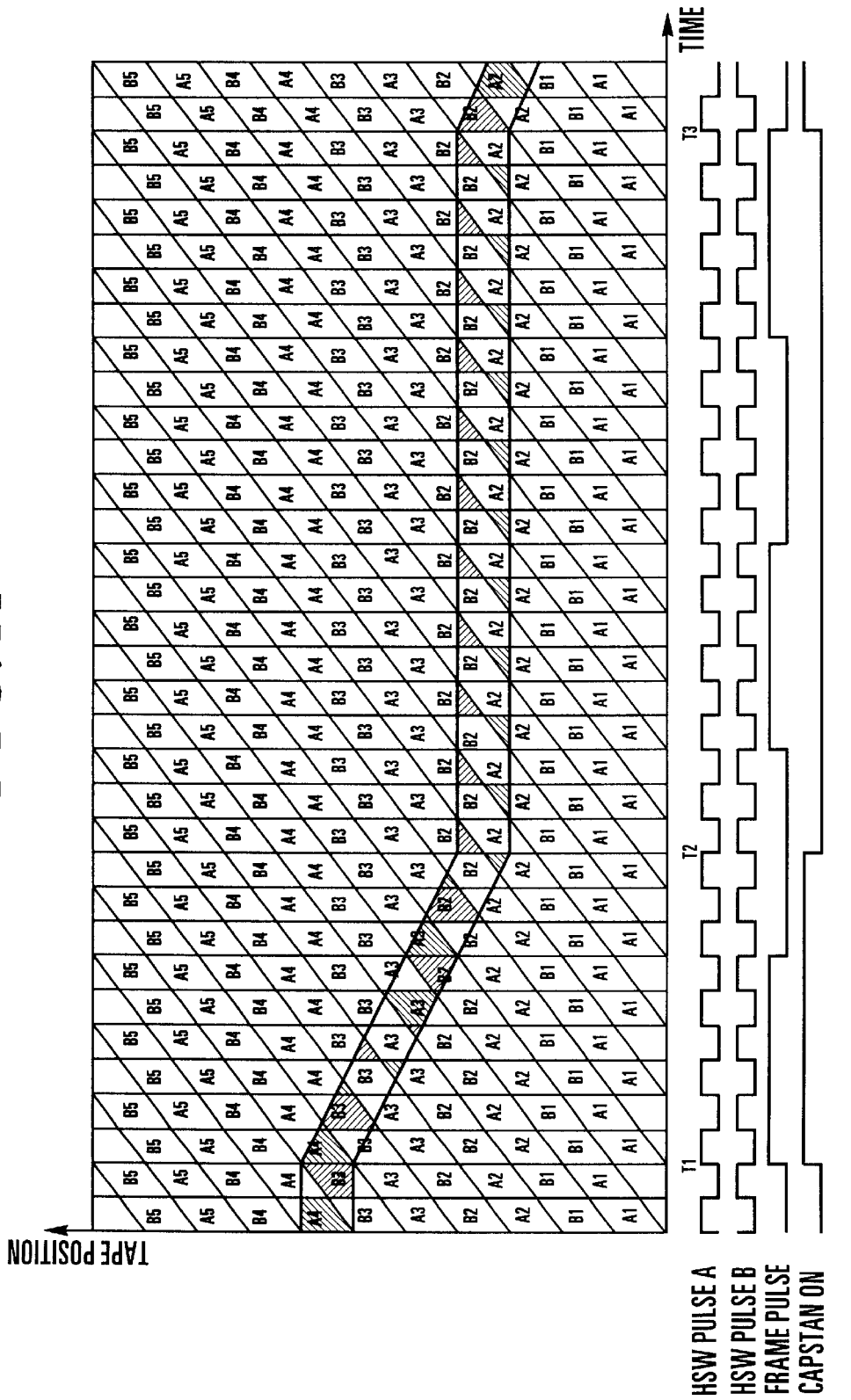
FIG. 11 shows a tracing locus obtained at the time of reverse slow reproduction of data recorded in the long-time recording mode by the VTR shown in FIG. 1.

FIG. 11 shows a tracing locus of the heads obtained when data recorded in the long-time recording mode is reproduced by the reverse slow reproduction at a speed which is 1/5 of the normal speed.

In carrying out the reverse slow reproduction of data recorded in the long-time recording mode, as in the slow reproduction in the forward direction, the speed and phase of the drum 109 are controlled in the same manner as in the case of the normal reproduction mode, and the tape transport speed is set to a speed which is the same as the speed for the slow reproduction of data recorded in the normal recording mode, i.e., 1/3 of the tape transport speed used for the normal recording mode.

Since video data for one frame is recorded in three tracks in the long-time recording mode, the tape 101 is traced alternately by the head (Ha) 103 and the head (Hb) 107, which are used for the normal recording mode, every time the drum 109 rotates 180 degrees, as indicated by hatched parts in FIG. 11. Further, the tape 101 is transported at a speed which is 1/3 of the tape transport speed of the normal recording mode for a period of 1.5 frames, i.e., a period between points of time T1 and T2 as shown in FIG. 11. The video data for one frame recorded in tracks B3, A3 and B2 thus can be completely reproduced.

In slow-reproducing the data recorded in the long-time recording mode, according to the recording-mode information included in the reproduced data, the control part 135 sends a control signal (capstan ON signal) to the driver 145 as shown in FIG. 11 so as to cause the tape 101 to be transported in the direction reverse to that of the normal reproduction mode at the speed which is 1/3 of the tape transport speed of the normal recording mode for a period of 1.5 frames and, after that, to stop the transport of the tape 101 for a period of 3.5 frames.

Further, in the same manner as in the slow reproduction of data recorded in the normal recording mode, the control part 135 sends, when data for one track has been stored in the track memory 121, a control signal to the memory control circuit 131 to change the writing bank of the track memory 121 from one bank over to another. The control part 135 also controls the video memory 125 to change its output picture from one picture over to another by changing the reading bank thereof at intervals of five frames.

In the first embodiment, as described above, even when data recorded in the long-time recording mode is slow-reproduced in the reverse direction, the heads used for the normal recording mode are used, the transport speed of the tape is set to the same speed as the tape transport speed for the slow reproduction of data recorded in the normal recording mode, and the period of transport of the tape is set to one half of the period for the slow reproduction of data recorded in the normal recording mode. This arrangement enables the first embodiment to stably control the tape transport speed even in the case of the reverse slow reproduction of data recorded in the long-time recording mode. The data thus can be reproduced in the same manner as in the case of the reverse slow reproduction of data recorded in the normal recording mode.

Another mode of carrying out normal-direction slow reproduction of data recorded in the long-time recording mode with the digital VTR of FIG. 1 is next described as a second embodiment of the invention.

In this case also, the head (Ha) 103 and the head (Hb) 107 are used for reproducing data.

Figure 12:
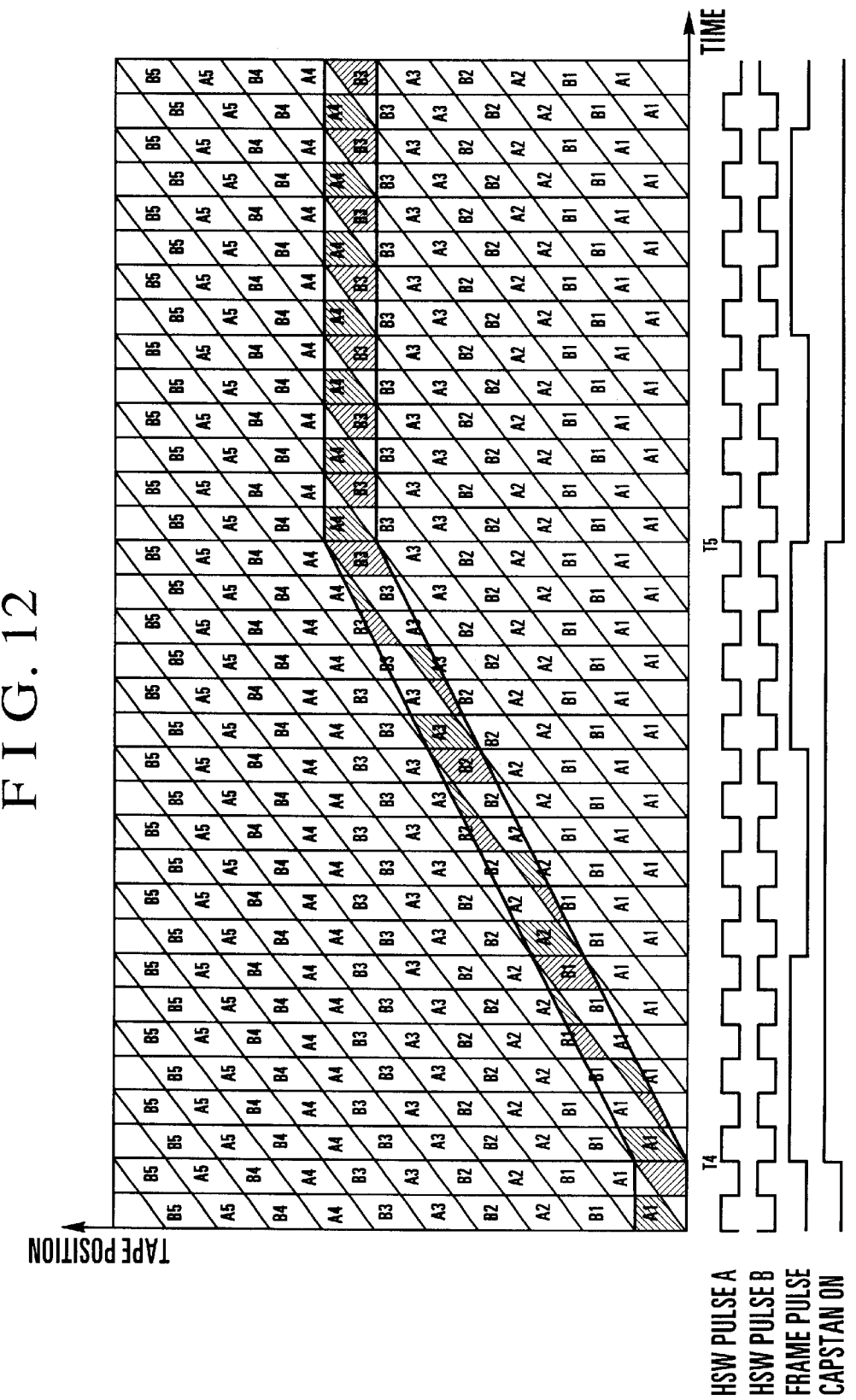
FIG. 12 shows another tracing locus obtained at the time of slow reproduction of data recorded in the long-time recording mode by the VTR shown in FIG. 1, according to another embodiment of the invention.

FIG. 12 shows a tracing locus of the heads obtained by slow-reproducing data recorded in the long-time recording mode in the second embodiment. FIGS. 13(a) to 13(d) are timing charts for explaining actions shown in FIG. 12.

In the second embodiment, the speed and phase of rotation of the drum 109 are controlled in the same manner as in the case of the normal reproduction mode. However, the tape transport speed is set to the same speed as the tape transport speed for the slow reproduction of data recorded in the normal recording mode, i.e., a speed which is 1/3 of the speed of the normal recording mode.

Since video data for one frame is recorded in three tracks in the second embodiment, the tape 101 is traced alternately by the head (Ha) 103 and the head (Hb) 107, which are used for the normal recording mode, every time the drum 109 rotates 180 degrees, as indicated by hatched parts in FIG. 12. Further, the tape 101 is transported at a speed which is ⅓ of the speed of the normal recording mode for a period of three frames, i.e., a period between points of time T4 and T5 as shown in FIG. 12. The video data for two frames recorded in tracks A1, B1 and A2 and tracks B2, A3 and B3 thus can be completely reproduced.

Figure 13:
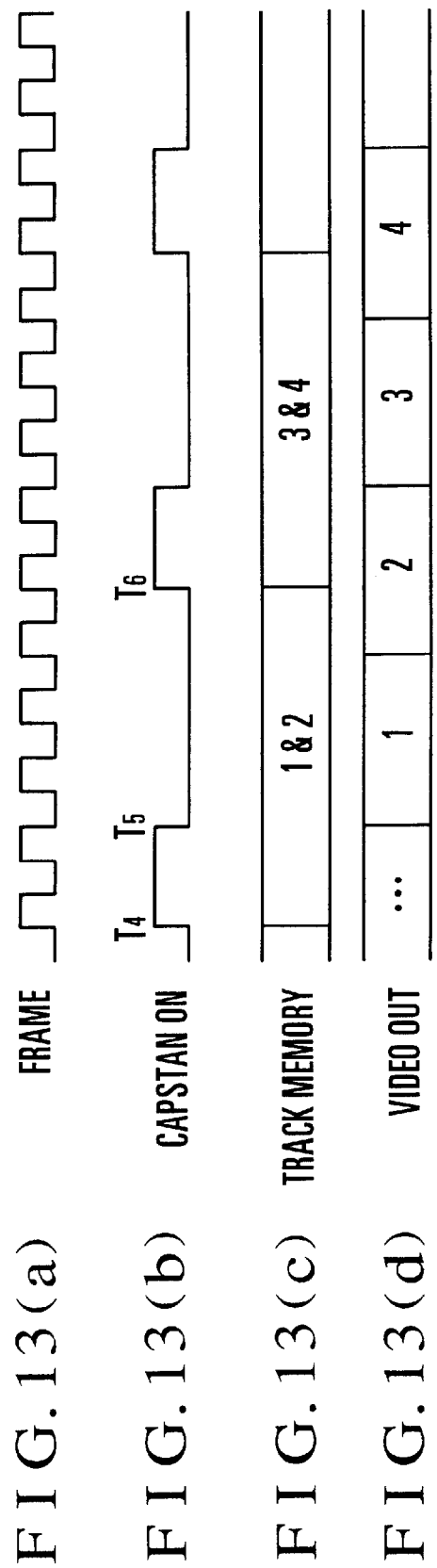
FIGS. 13(a) to 13(d) show the timing of the operation shown in FIG. 12.

In the slow reproduction of data recorded in the long-time recording mode, according to the recording-mode information included in the reproduced data, the control part 135 sends a control signal (capstan ON signal) to the driver 145 as shown in FIG. 12 and FIGS. 13(*a*) to 13(*d*) so as to cause the tape 101 to be transported at the speed which is ⅓ of the speed of the normal recording mode for a period of three frames and, after that, to stop the transport of the tape 101 for a period of seven frames.

In the case of the second embodiment, reproduced data for two frames is obtained during the period of three frames as shown in FIG. 13(*c*), and the reproduced data for two frames is stored in the track memory 121. Then, in the same manner as in the case of the first embodiment described in the foregoing, the control part 135 sends, when data for one track has been stored in the track memory 121, a control signal to the memory control circuit 131 to change the writing bank of the track memory 121 from one bank over to another. The control part 135 also controls the video memory 125 to change its output picture from one picture over to another at intervals of five frames.

In the second embodiment, as described above, when the slow reproduction of data recorded in the long-time recording mode is performed, as in the case of the first embodiment, the heads used for the normal recording mode are used, the tape transport speed is set to the same speed as the tape transport speed for the slow reproduction of data recorded in the normal recording mode, and the period of transport of the tape is set to a period of three frames, which is the same as the period of the slow reproduction of data recorded in the normal recording mode. By this arrangement, video data for two frames is reproduced during one period of transport of the tape. The arrangement enables the second embodiment to stably control the tape transport speed even in the case of the slow reproduction of data recorded in the long-time recording mode. The data thus can be reproduced in the same manner as in the case of the slow reproduction of data recorded in the normal recording mode.

In each of the embodiments described above, in the long-time recording mode, the amount of information of a video signal is reduced to one half (½) of the amount of information of the video signal (data) obtained in the normal recording mode, and the number of tracks in which the video signal for one frame is to be recorded is also set to one half (½) of the number of tracks of the normal recording mode. However, such number may be changed to ⅓, to ½ or to some other suitable ratios as desired.

Further, in accordance with the invention, the arrangement of heads is not limited to the arrangement shown in FIGS. 1 and 2 but may be changed as desired.

Figure 14:
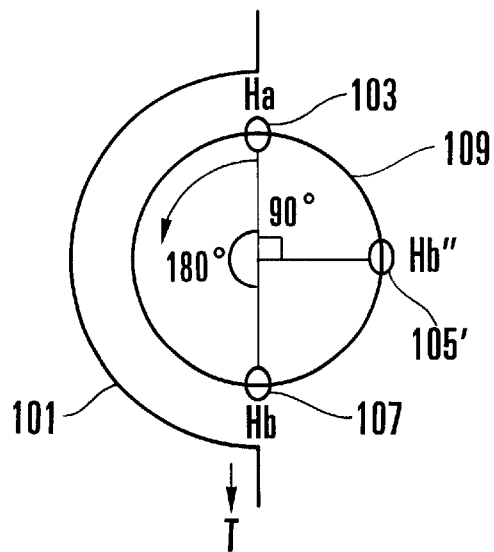
FIG. 14 shows the arrangement of heads of the digital VTR according to a further embodiment of the invention.

For example, the arrangement of heads may be changed as shown in FIG. 14.

Figure 15:
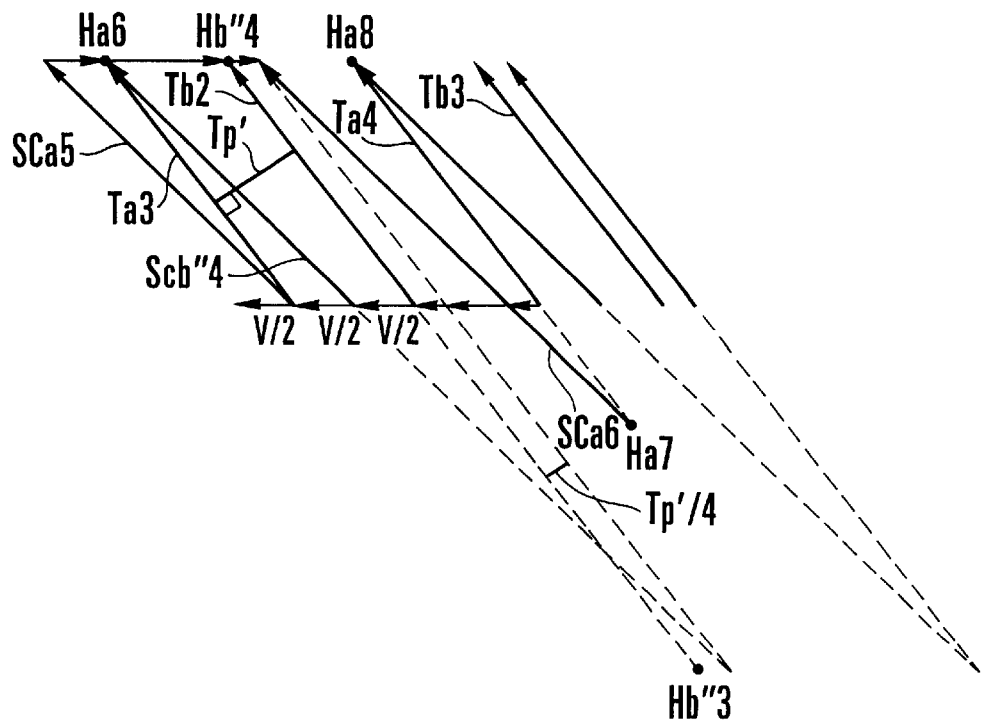
FIG. 15 shows a track format formed by the heads shown in FIG. 14.
Figure 16:
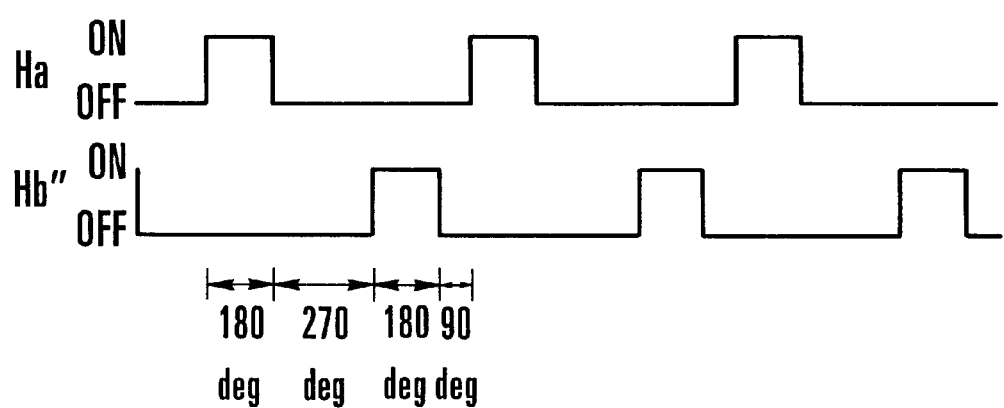
FIG. 16 shows the timing of change-over of the heads shown in FIG. 14.

In the case of FIG. 14, the phase of a head (Hb") 105' is arranged to delay 90 degrees with respect to the phase of the head (Ha) 103. In this case, the mounting height of the head (Hb") 105' relative to the head (Ha) 103 is arranged to be lower as much as ¼ of a track pitch Tp', as shown in FIG. 15. The track pitch Tp' is obtained by delaying the head switching (change-over) timing as much as ¼ rotation (90 degrees) as shown in FIG. 16. This arrangement of heads enables the heads to form tracks in the same manner as the head arrangement shown in FIG. 2.

Further, in each of the embodiments described above, the speed of slow reproduction is set to a speed which is ⅓ of the normal speed. However, this speed of course may be changed to some other suitable speeds by combining the tape transport speed and the tape transport period as desired.

What is claimed is:

1. An apparatus for reproducing video data recorded on a tape-shaped recording medium in one of a first recording mode in which the video data is recorded while the tape-shaped recording medium is transported at a first speed one after another and a second recording mode in which the video data is recorded while the tape-shaped recording medium is transported at a second speed different from the first speed one after another, said apparatus comprising:

transport means for transporting the tape-shaped recording medium;

reproducing means for reproducing the video data from the tape-shaped recording medium; and mode setting means for selectively setting one of a plurality of modes including a first slow reproduction mode in which video data recorded in the first recording mode is reproduced by said reproducing means while the tape-shaped recording medium is transported by said transport means at a third speed different from each of the first and second speeds and a second slow reproduction mode in which video data recorded in the second recording mode is reproduced by said reproducing means while the tape-shaped recording medium is transported by said transport means at the third speed.

2. An apparatus according to claim 1, wherein, in the first recording mode, the video data for one frame is recorded in n tracks formed on the tape-shaped recording medium, and, in the second recording mode, the video data for one frame is recorded in m (n>m) tracks formed on the tape-shaped recording medium.

3. An apparatus according to claim 1, wherein the video data is recorded in a state of having an amount of information thereof compressed, and the amount of information of the video data for one frame recorded in the first recording mode is greater than the amount of information of the video data for one frame recorded in the second recording mode.

4. An apparatus according to claim 1, further comprising expanding means for expanding an amount of information of video data reproduced by said reproducing means.

5. An apparatus according to claim 1, further comprising a memory for storing video data reproduced by said reproducing means, and memory control means for controlling an action of writing the reproduced video data into said memory according to ID data included in the reproduced video data.

6. An apparatus according to claim 5, wherein said memory has a plurality of banks each of which is capable of storing therein the reproduced video data for one frame, and said memory control means changes writing banks among said plurality of banks according to the ID data.

7. An apparatus according to claim 6, wherein said memory control means changes writing banks in response to the reproduced video data having been written into said memory.

8. An apparatus according to claim 1, wherein said transport means makes intermittent driving of the tape-shaped recording medium in the first slow reproduction mode and in the second slow reproduction mode, and the intermittent driving includes a first period during which the tape-shaped recording medium is transported at the third speed and a second period during which the tape-shaped recording medium is stopped from being transported.

9. An apparatus according to claim 8, wherein said transport means makes the first period in the second slow reproduction mode shorter than the first period in the first slow reproduction mode.

10. An apparatus according to claim 8, wherein an amount of information of the video signal for one frame recorded in the second recording mode is 1/N (N being an integer not less than 2) of that recorded in the first recording mode, and a length of the first period in the second slow reproduction mode is 1/N of that of the first period in the first slow reproduction mode.

11. An apparatus according to claim 1, wherein said reproducing means reproduces the video data by selectively using n (n being an integer not less than 3) rotary heads.

12. An apparatus according to claim 11, wherein said reproducing means reproduces the video data by using only predetermined rotary heads among the n rotary heads in the first slow reproduction mode and in the second slow reproduction mode.

13. An apparatus according to claim 11, wherein the plurality of modes further include a first normal reproduction mode in which the video data recorded in the first recording mode is reproduced by said reproducing means while the tape-shaped recording medium is transported by said transport means at the first speed and a second normal reproduction mode in which the video data recorded in the second recording mode is reproduced by said reproducing means while the tape-shaped recording medium is transported by said transport means at the second speed, and said reproducing means reproduces the video data by using different rotary heads among the n rotary heads among the first normal reproduction mode and the second normal reproduction mode.

14. An apparatus according to claim 13, wherein said n rotary heads include a first head having a first azimuth, a second head having a second azimuth different from the first azimuth, and a third head disposed close to said first head and having the second azimuth, and said reproducing means reproduces the video data by using said first head and said second head in the first normal reproduction mode and by using said first head and said third head in the second normal reproduction mode.

15. An apparatus according to claim 14, wherein said reproducing means reproduces the video data by using said first head and said second head in the first slow reproduction mode and in the second slow reproduction mode.

16. An apparatus according to claim 14, wherein said first head and said second head are arranged in positions with a phase difference of about 180 degrees.

17. An apparatus according to claim 11, wherein a rotation speed of the n rotary heads is substantially the same in the first recording mode and the second recording mode.

18. An apparatus for reproducing video data recorded on a tape-shaped recording medium in one of a plurality of recording modes in which the video data is recorded while the tape-shaped recording medium is transported at respective different speeds, said apparatus comprising:

transport means for transporting the tape-shaped recording medium;

reproducing means for reproducing the video data from the tape-shaped recording medium; and control means for controlling said transport means and said reproducing means so as to reproduce the video data by making intermittent driving of the tape-shaped recording medium in a slow reproduction mode, said intermittent driving including a first period during which the tape-shaped recording medium is transported at a predetermined speed and a second period during which the tape-shaped recording medium is stopped from being transported, said control means varying a length of the first period according to a recording mode in which the video data to be reproduced has been recorded.

19. An apparatus according to claim 18, wherein said control means controls said transport means and said reproducing means so as to reproduce the video data by transporting the tape-shaped recording medium at a speed according to the recording mode in a normal reproduction mode.

20. An apparatus for reproducing video data recorded on a tape-shaped recording medium in one of a first recording mode in which the video data is recorded by using a first rotary head having a first azimuth and a second rotary head having a second azimuth different from the first azimuth to form a number of tracks on the tape-shaped recording medium and a second recording mode in which the video data is recorded by using said first rotary head and a third rotary head disposed close to said first rotary head and having the second azimuth to form a number of tracks on the tape-shaped recording medium, said apparatus comprising:

reproducing means for reproducing the video data from the tape-shaped recording medium by using said first, second and third rotary heads; and mode setting means for selectively setting one of a plurality of modes including a first slow reproduction mode in which video data recorded in the first recording mode is reproduced by using said first and second rotary heads while the tape-shaped recording medium is transported at a speed slower than a speed used in recording and a second slow reproduction mode in which video data recorded in the second recording mode is reproduced by using said first and second rotary heads while the tape-shaped recording medium is transported at a speed slower than a speed used in recording.

21. An apparatus according to claim 20, wherein the plurality of modes further include a first normal reproduction mode in which video data recorded in the first recording mode is reproduced by using said first and second rotary heads while the tape-shaped recording medium is transported at the same speed as the speed used in recording and a second normal reproduction mode in which video data recorded in the second recording mode is reproduced by using said first and third rotary heads while the tape-shaped recording medium is transported at the same speed as the speed used in recording.

22. An apparatus for reproducing video data recorded on a tape-shaped recording medium in one of a plurality of recording modes in which the video data is recorded at respective different speeds, said apparatus comprising:

transport means for transporting the tape-shaped recording medium;

reproducing means for reproducing the video data from the tape-shaped recording medium; and control means for controlling said transport means and said reproducing means so as to reproduce the video data by making intermittent driving of the tape-shaped recording medium in a slow reproduction mode, said intermittent driving including a first period during which the tape-shaped recording medium is transported at a predetermined speed and a second period during which the tape-shaped recording medium is stopped from being transported, said control means varying a length of the second period according to a recording mode in which the video data to be reproduced has been recorded.

23. An apparatus for reproducing video data recorded on a tape-shaped recording medium in one of a first recording mode in which the video data is recorded by using a first rotary head having a first azimuth and a second rotary head having a second azimuth different from the first azimuth to form a number of tracks on the tape-shaped recording medium and a second recording mode in which the video data is recorded by using said first rotary head and a third rotary head arranged in position with a phase difference of predetermined degrees with a respect to the first rotary head and having the second azimuth to form a number of tracks on the tape-shaped recording medium, said apparatus comprising:

reproducing means for reproducing the video data from the tape-shaped recording medium by using said first, second and third rotary heads; and mode setting means for selectively setting one of a plurality of modes including a first slow reproduction mode in which video data recorded in the first recording mode is reproduced by using said first and second rotary heads while the tape-shaped recording medium is transported at a speed slower than a speed used in recording and a second slow reproduction mode in which video data recorded in the second recording mode is reproduced by using said first and second rotary heads while the tape-shaped recording medium is transported at a speed slower than a speed used in recording.

24. An apparatus for reproducing video data recorded on a tape-shaped recording medium in one of a first recording mode in which the video data is recorded while the tape-shaped recording medium is transported at a first speed and a second recording mode in which the video data is recorded while the tape-shaped recording medium is transported at a second speed different from the first speed, said apparatus comprising:

transport means for transporting the tape-shaped recording medium;

reproducing means for reproducing the video data from the tape-shaped recording medium; and mode setting means for selectively setting one of a plurality of modes including a first slow reproduction mode in which video data recorded in the first recording mode is reproduced by said reproducing means while the tape-shaped recording medium is transported by said transport means at a third speed different from each of the first and second speeds and a second slow reproduction mode in which video data recorded in the second recording mode is reproduced by said reproducing means while the tape-shaped recording medium is transported by said transport means at the third speed, wherein said transport means makes intermittent driving of the tape-shaped recording medium in the first slow reproduction mode and in the second slow reproduction mode, and the intermittent driving includes a first period during which the tape-shaped recording medium is transported at the third speed and a second period during which the tape-shaped recording medium is stopped from being transported, and wherein an amount of information of the video signal for one frame recorded in the second recording mode is 1/N (N being an integer not less than 2) of that recorded in the first recording mode, and a length of the first period in the second slow reproduction mode is 1/N of that of the first period in the first slow reproduction mode.

* * * * *

UNITED STATES PATENT AND TRADEMARK OFFICE
CERTIFICATE OF CORRECTION

PATENT NO.      : 6,587,636 B1                                         Page 1 of 1
DATED           : July 1, 2003
INVENTOR(S)     : Shuya Tanaka It is certified that error appears in the above-identified patent and that said Letters Patent is hereby corrected as shown below:

<u>Title page, Item [54] and Column 1, line 1,</u>
Title, delete in its entirety and insert -- APPARATUS FOR REPRODUCING VIDEO DATA RECORDED IN A PLURALITY OF RECORDING MODES --.

<u>Column 11,</u>
Line 56, delete "½" and insert -- ¼ --.

Signed and Sealed this

Sixth Day of January, 2004

JAMES E. ROGAN
*Director of the United States Patent and Trademark Office*